(12) United States Patent
Iwabuchi

(10) Patent No.: US 7,903,144 B2
(45) Date of Patent: Mar. 8, 2011

(54) ELECTRIC HAND-VIBRATION CORRECTION METHOD, ELECTRIC HAND-VIBRATION CORRECTION DEVICE, ELECTRIC HAND-VIBRATION CORRECTION PROGRAM, AND IMAGING APPARATUS

(75) Inventor: Hiroshi Iwabuchi, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 559 days.

(21) Appl. No.: 11/970,863

(22) Filed: Jan. 8, 2008

(65) Prior Publication Data
US 2008/0174663 A1   Jul. 24, 2008

(30) Foreign Application Priority Data

Jan. 9, 2007   (JP) ................ P2007-001167

(51) Int. Cl.
*H04N 5/232* (2006.01)
(52) U.S. Cl. .............. 348/208.6; 348/208.99; 348/416.1; 382/103; 382/107; 375/240.16
(58) Field of Classification Search .............. 348/208.6, 348/208.99, 416.1; 382/103, 107; 375/240.16
See application file for complete search history.

(56) References Cited

U.S. PATENT DOCUMENTS

| 5,210,559 | A | * | 5/1993 | Ohki ................... 396/55 |
| 5,237,405 | A | * | 8/1993 | Egusa et al. .......... 348/208.1 |
| 5,307,170 | A | * | 4/1994 | Itsumi et al. ......... 348/219.1 |
| 5,581,276 | A | * | 12/1996 | Cipolla et al. ........ 345/156 |
| 5,805,937 | A | * | 9/1998 | Kitagawa ............. 396/55 |
| 5,930,378 | A | * | 7/1999 | Kubota et al. ........ 382/107 |
| 6,229,548 | B1 | * | 5/2001 | Edmark .............. 345/427 |
| 7,003,156 | B1 | * | 2/2006 | Yamamoto et al. .... 382/181 |
| 2002/0036692 | A1 | * | 3/2002 | Okada ............... 348/208 |
| 2005/0225645 | A1 | * | 10/2005 | Kaku ................. 348/208.99 |
| 2007/0014432 | A1 | * | 1/2007 | Tsunashima ......... 382/103 |
| 2007/0140529 | A1 | * | 6/2007 | Iwabuchi et al. ..... 382/107 |

FOREIGN PATENT DOCUMENTS

JP   61-201581 A   9/1986

* cited by examiner

*Primary Examiner* — John M Villecco
*Assistant Examiner* — Kent Wang
(74) *Attorney, Agent, or Firm* — Birch, Stewart, Kolasch & Birch, LLP

(57) ABSTRACT

In an electric hand-vibration correction method of dividing each of frame images output from an effective pixel region of an imaging element in frame order into a plurality of segment images, calculating a movement vector of each segment image between the frame images, calculating a movement vector of each entire frame image (hereinafter, referred to as a hand-vibration vector), from the movement vectors for the respective segment images, and determining an image output region that is cut out from each frame image, based on the hand-vibration vector, an infinite point F is calculated based on an intersectional position among the calculated movement vectors of the respective segment images, and the image output region is determined using a vibration vector between the infinite points calculated for the respective frame images as the hand-vibration vector.

7 Claims, 11 Drawing Sheets

FIG. 3

| #1 | #2 | #3 | #4 | #5 | #6 | #7 | #8 |
|---|---|---|---|---|---|---|---|
| #9 | #10 | #11 | #12 | #13 | #14 | #15 | #16 |
| #17 | #18 | #19 | #20 | #21 | #22 | #23 | #24 |
| #25 | #26 | #27 | #28 | #29 | #30 | #31 | #32 |
| #33 | #34 | #35 | #36 | #37 | #38 | #39 | #40 |
| #41 | #42 | #43 | #44 | #45 | #46 | #47 | #48 |

FIG. 5

| | | | | | | | |
|---|---|---|---|---|---|---|---|
| ↙K1 | ↙K2 | ↙K3 | ↙K4 | ↙K5 | ↙K6 | ↙K7 | ↙K8 |
| ↙K9 | ↙K10 | ↙K11 | ↙K12 | ↙K13 | ↙K14 | ↙K15 | ↙K16 |
| ↙K17 | ↙K18 | ↙K19 | ↙K20 | ↙K21 | ↙K22 | ↙K23 | ↙K24 |
| ↙K25 | ↙K26 | ↙K27 | ↗K28 | ↙K29 | ↙K30 | ↙K31 | ↙K32 |
| ↙K33 | ↙K34 | ↙K35 | ↑K36 | ↙K37 | ↙K38 | ↙K39 | ↙K40 |
| ↙K41 | ↙K42 | ↙K43 | ↙K44 | ↙K45 | ↙K46 | ↙K47 | ↙K48 |

ELECTRIC HAND-VIBRATION CORRECTION METHOD, ELECTRIC HAND-VIBRATION CORRECTION DEVICE, ELECTRIC HAND-VIBRATION CORRECTION PROGRAM, AND IMAGING APPARATUS

CROSS-REFERENCE TO RELATED APPLICATIONS

This application is based upon and claims the benefit of priority from the Japanese Patent Application No. 2007-1167 filed on Jan. 9, 2007, the entire contents of which are incorporated herein by reference.

BACKGROUND OF THE INVENTION

1. Technical Field

The invention relates to an electric hand-vibration correction method for use in a digital camera or the like, and more particularly, to an electric hand-vibration correction method, an electric hand-vibration correction device, an electric hand-vibration correction program, and an imaging apparatus, which are suitable to embody an electric hand-vibration correction when a picture of the outside of a movable body is taken when a user is on the movable body such as a vehicle, a train, a ship, and an airplane.

2. Description of the Related Art

For example, a user takes a moving picture with holding, in user's hands, a digital camera, a video camera, or the like having a function of taking a moving picture. In this case, if the hands holding the camera vibrate, a position of an image of a still object shown in an image of a certain frame moves in a display screen of the next frame. Thereby, it may be difficult to see the moving picture. Accordingly, there has been provided a method of detecting a hand-vibration vector of an image of a next frame with respect to an image of a certain frame and performing hand-vibration correction so as to prevent the image from vibrating.

FIG. 12 is a diagram illustrating a principle of detecting a movement vector necessary to perform the hand-vibration collection. In this example, each of an image 1 of Nth frame shown in FIG. 12(a) and an image 3 of (N+1)th frame shown in FIG. 12(b) is divided into four segment images, and the following process are performed for each of the segment pictures #1 to #4.

First, an image in a block 2 represented by a predetermined address in the image 1 of the Nth frame shown in FIG. 12(a) is set as a reference image. When an image cut out by a block 4 represented by the same predetermined address in the image 3 of the (N+1)th frame is equivalent to the reference image, the image 3 does not vibrate with respect to the image 1.

However, when the hand-vibration occurs, the reference image in the block 2 is not identical with the image cut out by the block 4. Accordingly, while the block 4 in the image 3 is shifted, in one-pixel unit, to blocks 4a, 4b, 4c, . . . in an X-direction (horizontal direction) and a Y-direction (vertical direction), each of images in the blocks 4a, 4b, 4, . . . is compared with the reference image, thereby acquiring a position of a block cutting a comparison image having the highest corcorrelativity to the reference image.

An operation for acquiring the correlativity is performed by calculating an absolute value of a sum of differences in pixel data (brightness data) in between each pixel of the reference image and those of the comparison images. The comparison image having the minimum absolute value becomes the comparison image having the highest correlativity.

In FIG. 12(b), it is assumed that the comparison image having the highest correlativity with respect to the reference image of the block 2 is cut out from the block 4c. In this case, a difference from the image 1 to the image 3 is a vector "k1." The vector k1 is a movement vector in the segment picture #1.

Similarly, in the other segment pictures #2 to #4, it is assumed that movement vectors k2 to k4 are calculated, for example. In this case, a simple addition average vector k=[(k1+k2+k3+k4)/4] is a hand-vibration vector between the two pictures.

After the image 1 is displayed, the image 3 is displayed with being shifted in a direction opposite to the hand-vibration vector k (actually, an effective pixel region is widened so that an imaging element can take an image in a region larger than a region of an image to be displayed, and then a cutting-out region of the displayed image, that is, an output region is shifted), the image of the still object in the image 3 overlaps the image of the same still object in the image 1. Therefore, it is possible to display the image without the vibration.

There is JP Sho. 61-201581 A relating to technique for detecting a hand-vibration vector.

The electrically reliable hand-vibration correction can be performed based on the principle described in FIG. 12. However, there is a case where the hand-vibration correction may not be performed, depending on a taken scene. For example, when a picture of the outside scene is taken from a movable body such as a vehicle, an image of a photographic subject moves in the picture as the movable body moves. Accordingly, a large movement vector is calculated in each of the segment pictures shown in FIG. 12. For this reason, it is difficult to extract a small movement vector caused by the hand-vibration or the vibration of the movable body. Thus, it is difficult to perform the hand-vibration correction. Hereinafter, "hand-vibration" is defined to include image blur resulting from the vibration of the movable body.

The invention provides an electric hand-vibration correction method, an electric hand-vibration correction device, an electric hand-vibration correction program, a computer-readable medium storing the program and an imaging apparatus, which are capable of reliably performing an electric hand-vibration correction even if a picture of the outside of a movable body is taken from the movable body.

According to an aspect of the invention, an electric hand-vibration correction method, an electric hand-vibration correction device, an electric hand-vibration correction program divides each of frame images output from an effective pixel region of an imaging element in frame order into a plurality of segment images, calculating a movement vector of each segment image between the frame images, calculating a hand-vibration vector that is a movement vector of each entire frame image, from the movement vectors for the respective segment images, determining an image output region that is cut out from each frame image, based on the hand-vibration vector, and calculating an infinite point based on an intersectional position among the calculated movement vectors of the respective segment images. The image output region is determined using a vibration vector between the infinite points calculated for the respective frame images as the hand-vibration vector.

Also, the image output region may be determined so as to fix positions of the infinite points calculated for the respective frame images.

Also, the image output region may be determined so that positions of the infinite points calculated for the respective frame images always have the same distance from a fixed point in the frame images.

Also, a straight line connecting a infinite point calculated for a certain frame image and a central point of the certain frame image may be calculated. The image output region may be determined based on a component, of the vibration vector between the infinite point calculated for the certain frame image and an infinite point calculated for a next frame image, perpendicular to the straight line with a component, of the vibration vector between the infinite point calculated for the certain frame image and the infinite point calculated for the next frame image, along the straight line being ignored.

Also, the image output region may be determined so as to correct only components having a variation frequency equal to or higher than a predetermined frequency in the vibration vectors calculated in frame order.

According to another aspect of the invention, an imaging apparatus includes an imaging element and any of the electric hand-vibration correction devices set forth above.

According to the invention, the hand-vibration correction is performed using the infinite point. Therefore, it is possible to reliably correct the hand vibration, which occurs even when a picture of the outside of the movable body is taken from the movable body such as a vehicle, a ship, and an airplane.

BRIEF DESCRIPTION OF THE DRAWINGS

FIG. 3 is a diagram illustrating segment pictures used in the embodiment of the invention.

FIG. 5 is a diagram illustrating an example of movement vectors calculated for the segment pictures shown in FIG. 3.

DETAILED DESCRIPTION OF EMBODIMENTS OF THE INVENTION

Hereinafter, embodiments of the invention will be described with reference to the drawings.

Figure 1:
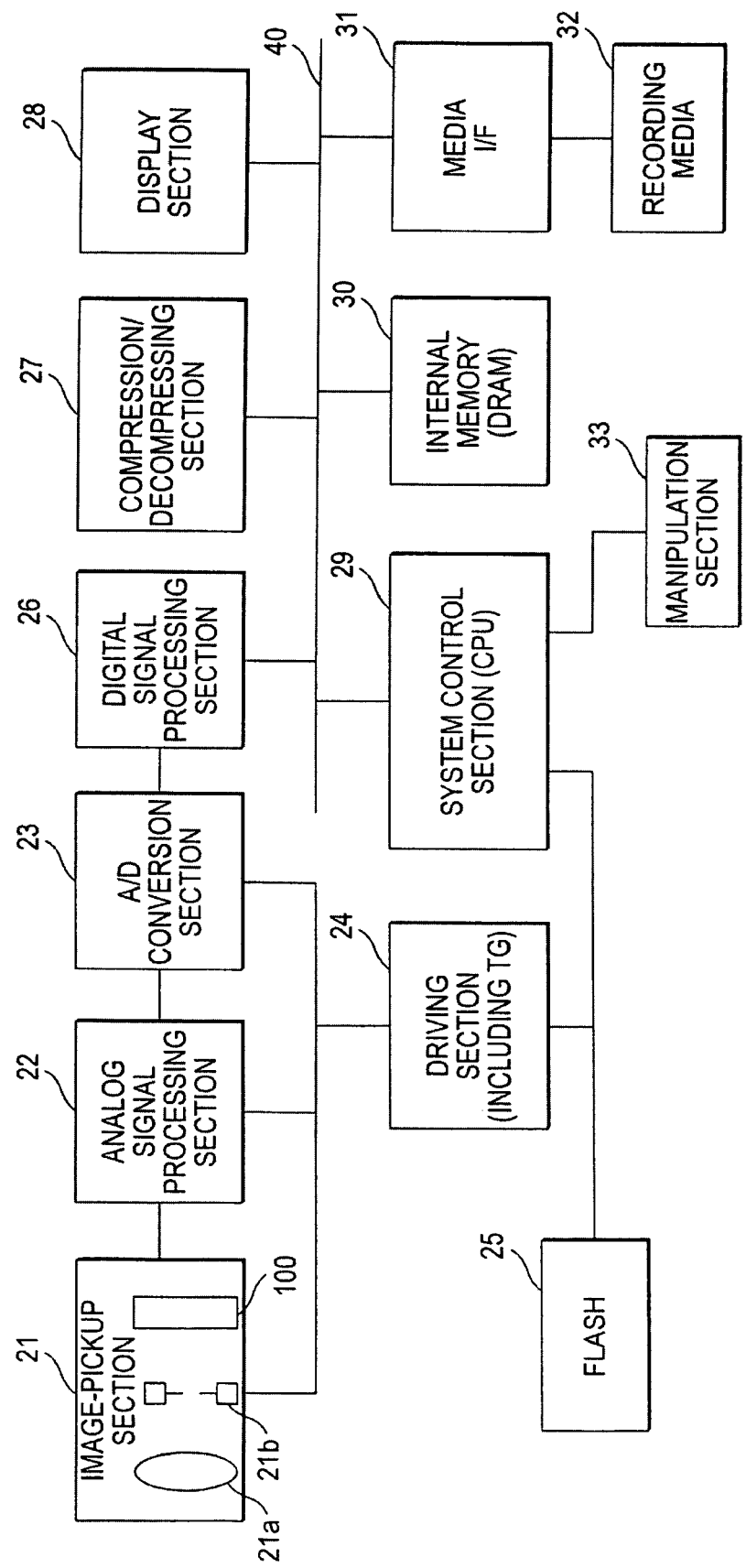
FIG. 1 is a block diagram illustrating a digital camera according to an embodiment of the invention.

FIG. 1 is a diagram illustrating a digital camera according to an embodiment of the invention. This digital camera includes an imaging section 21; an analog signal processing section 22 that performs analog processes, such as an automatic gain control (AGC) and a correlated double sampling process, for analog image data output from the imaging section 21; an analog/digital conversion section (A/D) 23 that converts the analog image data output from the analog signal processing section 22 into digital image data; a driving control section 24 that controls the A/D 23, the analog signal processing section 22, and the imaging section 21 in accordance with a command input from a system control section (CPU) 29 which will be described later, and a flash 25 that emits light in accordance with a command from the CPU 29.

The imaging section 21 includes an optical lens system 21a that focuses light from a photographic subject, an iris diaphragm 21b, and a solid-state imaging element 100 that receives the light, which is focused by the optical lens system 21a and is made narrow by the iris diaphragm 21b, and outputs captured image data (analog image data).

The solid-state imaging element 100 may be formed of a CCD type, a CMOS type, or another type. The solid-state imaging element 100 has an effective pixel region wider than an image display range in order to perform an electric hand-vibration correction process.

The digital camera of this embodiment includes a digital signal processing section 26 that acquires the digital image data output from the A/D 23 and performs an interpolation process, a white balance correction, an RGB/YC conversion process, and the like; a compression/decompression processing unit 27 that compresses the image data into a JPEG or MPEG image data or decompresses the compressed data; a display section 28 that displays a menu or the like and displays a through-image and a captured image; the system control section (CPU) 29 that collectively controls the entire digital camera; an internal memory 30 such as a frame memory; a media interface (I/F) section 31 that performs an interface process between the digital camera and a recording media 32 that stores JPEG image data, MPEG image data, and the like; and a bus 40 that connects these components to one another. The system control section 29 is connected to a manipulation section 33 for inputting a command from a user.

Figure 2:
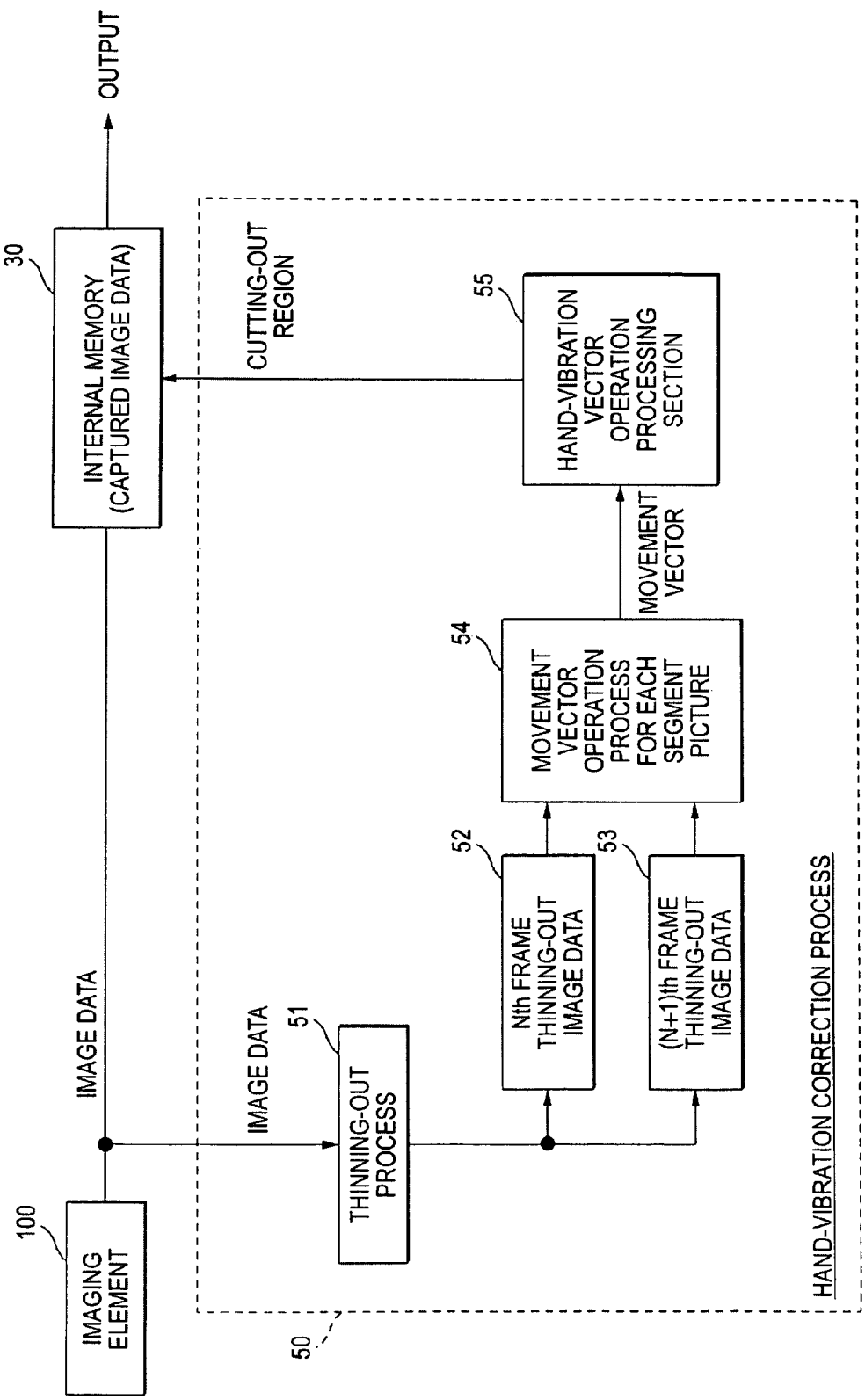
FIG. 2 is a functional block diagram illustrating an electric hand-vibration correction processing device built in the digital camera according to the embodiment of the invention.

FIG. 2 is a functional diagram illustrating an electric hand-vibration correction processing device 50 in the case where the electric hand-vibration correction process is performed in the digital camera shown in FIG. 1. When a command to perform the electric hand-vibration correction process is input through the manipulation section 33 shown in FIG. 1 by a user, the system control section 29 activates an electric hand-vibration correction program so that the subordinate digital signal processing section 26 and the internal memory 30 under control of the system control section 29 constitute the electric hand-vibration correction processing device 50.

Figure 12A:
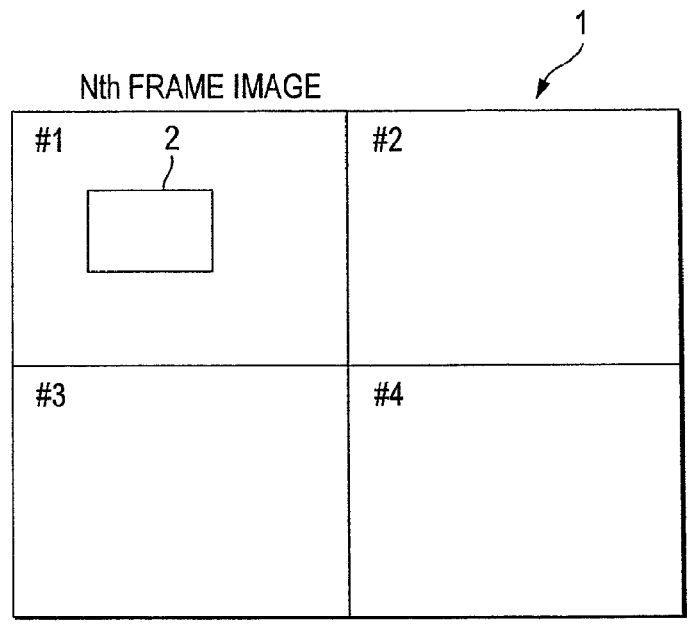
FIG. 12 is a diagram illustrating principle of detecting the hand-vibration vector.
Figure 12B:
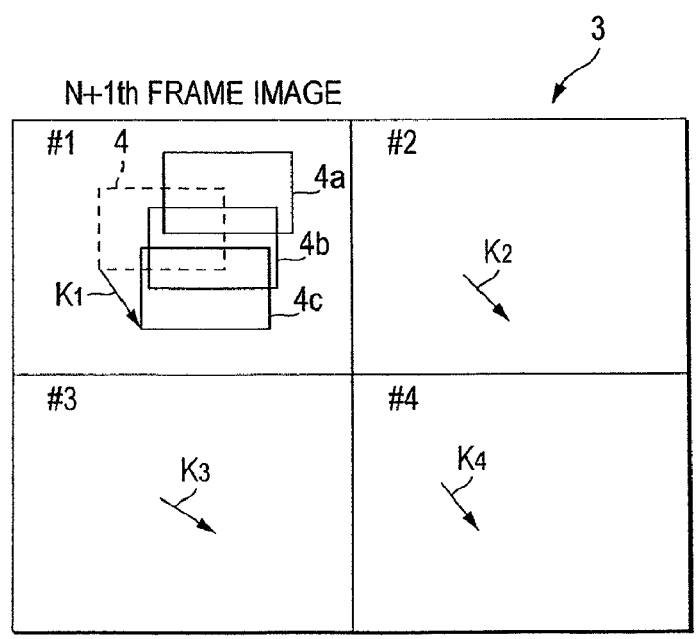

The electric hand-vibration correction processing device 50 includes a thing-out processing section 51 that performs a thinning-out process for the image data output from the solid-state imaging element 100 to produce a reduction image; a first memory 52 that stores the thinning-out reduction image data of an Nth frame (even frame); a second memory 53 that stores the thinning-out reduction image data of an (n+1)th frame (odd frame); an operation processing section 54 that reads out the reduction image data from the first and second memories 52 and 53 and calculates a movement vector for each segment picture which is described with reference to FIG. 12; and a hand-vibration vector operation processing section 55 that calculates a hand-vibration vector between pictures based on the movement vectors for the respective segment pictures calculated by the operation processing section 54 to variably control a cutting-out region of a display image read out from the memory 30.

In this embodiment, in order to execute a high speed of the movement vector calculating process, reduction images of a reference image and a comparison image are generated by the thinning-out processing section 51. A high-performance operation processing device may be used. If there is an enough capacity of the memory, it is possible to calculate a movement vector by using origin image data the thinning-out being process performed.

In such an electric hand-vibration correction processing device 50, an operation at the time of performing the electric hand-vibration correction for a captured image will be described. Even-frame captured image data and odd-frame captured image data are alternately output from the solid-state imaging element 100, and the respective captured image data are stored in the internal memory 30.

While the captured image data output from the effective pixel region of the solid-state imaging element 100 are stored in the internal memory 30, the captured image date become reduction image data by passing through the thinning-out processing section 51, and the reduction data are stored in the memories 52 and 53, respectively.

A process of detecting a hand-vibration vector of (n+1)th frame image data with respect to Nth frame image data will be described hereinafter. The reference image is cut out from the Nth frame image data (reduction image data), and the comparison image is cut out from the Nth frame image data (reduction image data). Then, a correlativity between both the images is acquired.

In this embodiment, one picture (one picture is defined as an entire frame image output from the effective pixel region) is divided into 6×8=48 segment pictures #1 to #48 as shown in FIG. 3. The operation processing section 55 calculates a movement vector for each segment picture and calculates a movement vector between pictures from the 48 movement vectors, that is, a hand-vibration vector.

Figure 4:
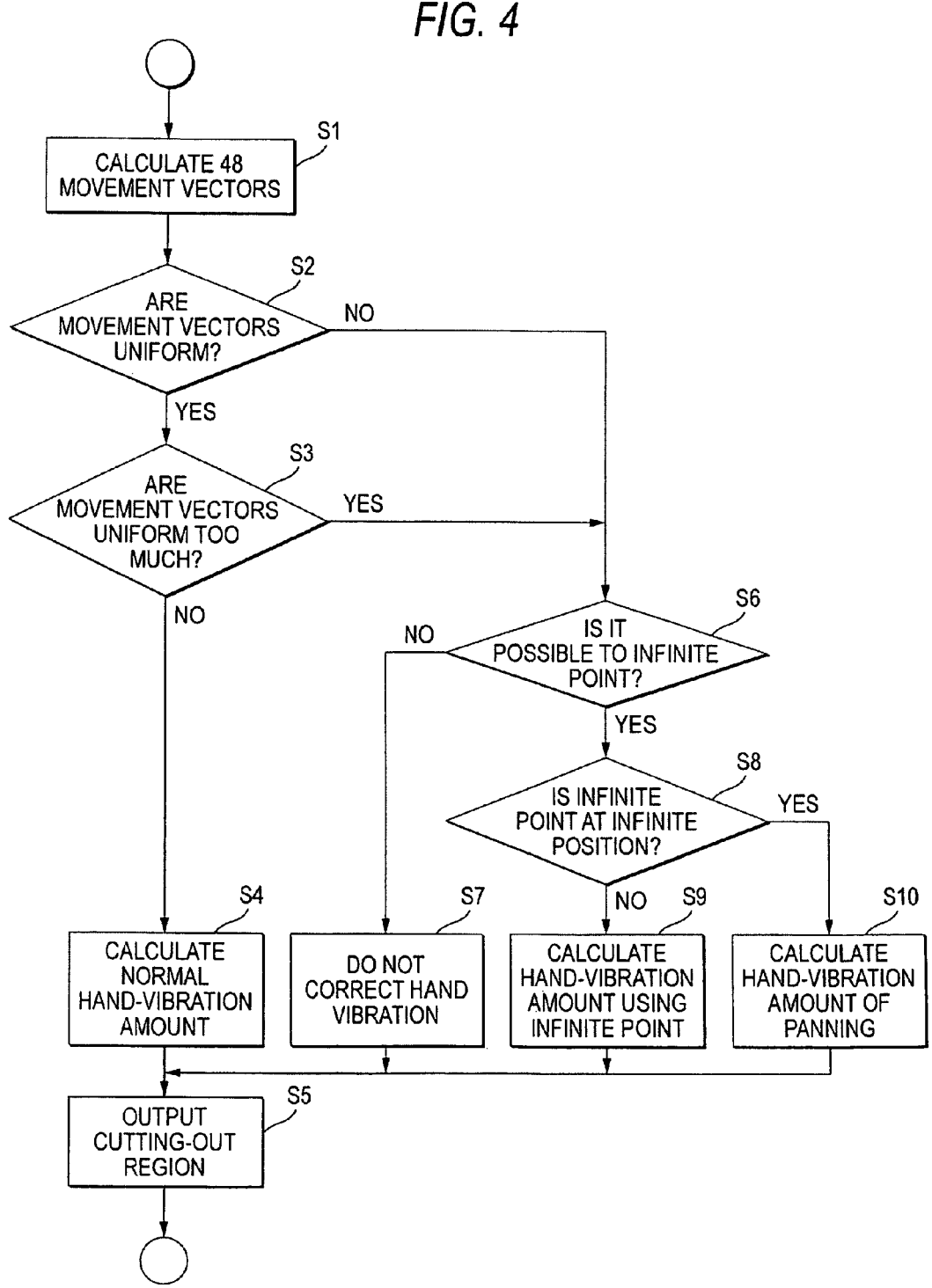
FIG. 4 is a flowchart illustrating a process procedure of the electric hand-vibration correction processing device shown in FIG. 2.

FIG. 4 is a flowchart illustrating a process performed by the electric hand-vibration correction processing device 50 whenever a frame image is acquired. First, in step S1, the operation processing section 54 calculates the 48 movement vectors for the respective segment pictures. The following steps are performed by the hand-vibration vector operation processing section 55.

In step S2, it is judged as to whether or not the 48 movement vectors are uniform. Since the hand vibration is uniform image blur in the entire picture, the 48 movement vectors should be uniform in the same direction and with the same length.

However, when a small animal or the like moving around in the picture is taken, the movement vectors in segment pictures in which the small animal is taken are different from the other movement vectors. For example as shown in FIG. 5, since the small animal is taken in the segment pictures #28 and #36, the movement vectors k28 and k36 are different from the other vectors, that is, the movement vectors k28 and k36 becomes abnormal vectors.

Also, since the camera may moves not only in a parallel direction but also in a rotation direction, all the hand vibrations do not have the same direction and the same length. In step S2, it is judged as to whether or not movement vectors more than a predetermined number are the same within a range of a predetermined threshold value. When it is judged that the movement vectors are the same, it is determined that the movement vectors uniform.

Figure 6A:
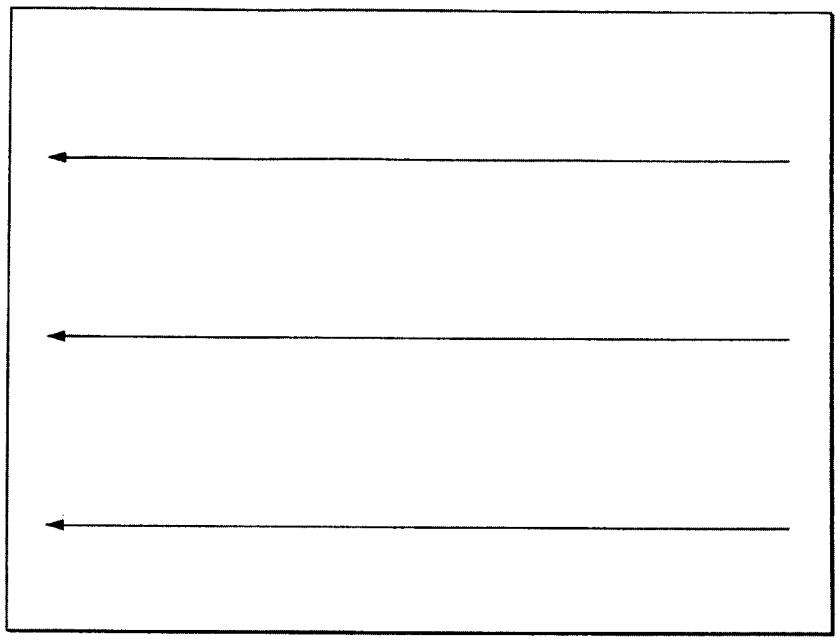
FIG. 6 is a diagram illustrating a flow of a captured image when a picture of outside scene is taken from a movable body moving in a proceeding direction.
Figure 6B:
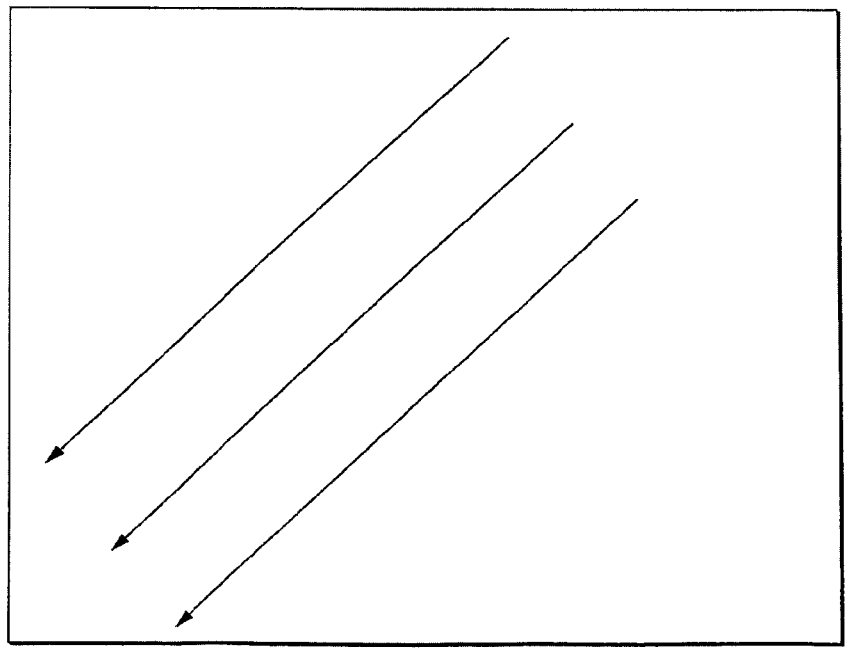

When the judgment in step S2 is positive, it is judged as to whether or not the movement vectors are uniform too much in step S3. For example, when panning or tilting the camera or taking a picture of a side scene of a movable body such as a train moving in a proceeding direction, the entire captured image flows in one direction indicated by arrows as shown in FIGS. 6(a) and 6(b). On the other hand, the hand vibration does not occur in the same direction for 0.5 second. For this reason, when the images flow in the same direction but not the hand vibration, the movement vectors of the segment pictures are substantially the same (falling within a range smaller than the range of the predetermined threshold value). Accordingly, it is difficult to calculate the hand-vibration vector based on the simple addition average of the movement vectors described with reference to FIG. 12.

When the judgment is negative in step S3, that is, the movement vectors are uniform appropriately and are not uniform too much, the process goes to step S4 and the general calculation of the hand-vibration vector is performed. For example, the hand-vibration vector is calculated based on the simple addition average of the other movement vectors excluding the abnormal vectors k28 and k36 shown in FIG. 5, and an image cutting-out region is obtained. In step S5, the image cutting-out region is output to the memory 30.

When the judgment is negative in step S2, that is, the movement vectors are not uniform, the process goes to Step S6. In addition, when the judgment is positive in step S3, that is, the movement vectors are uniform too much, the process goes to step S6.

In step 6, it is judged, based on the movement vectors, as to whether or not an infinite point exists. If the infinite point exists, a coordinate position of the infinite point is calculated as an intersectional position of the movement vectors excluding the abnormal vectors. Alternatively, a plurality of intersectional positions among the movement vectors are calculated, and then one position that is a majority among the intersectional positions and at which the intersectional positions more than a predetermined number exist is set as a coordinate position of the infinite point. When no intersectional position is calculated, it is considered that a coordinate position of the infinite point is at an infinite position.

Figure 7A:
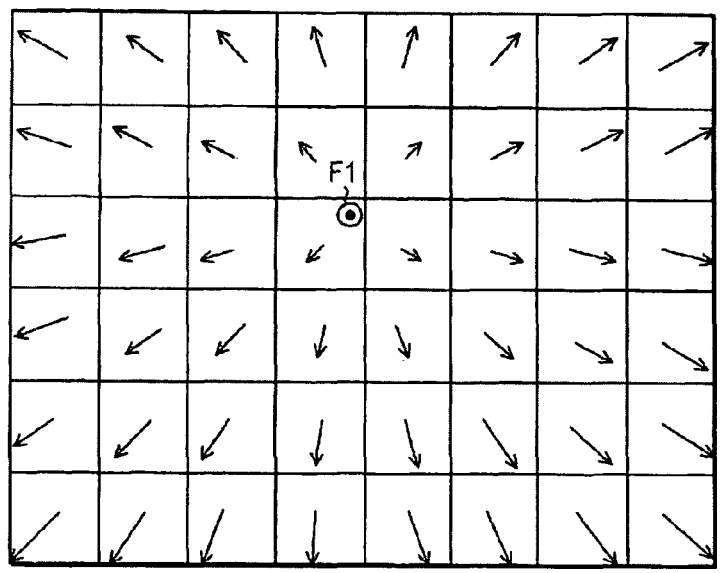
FIG. 7 is a movement-vector diagram illustrating an infinite point F1.
Figure 7B:
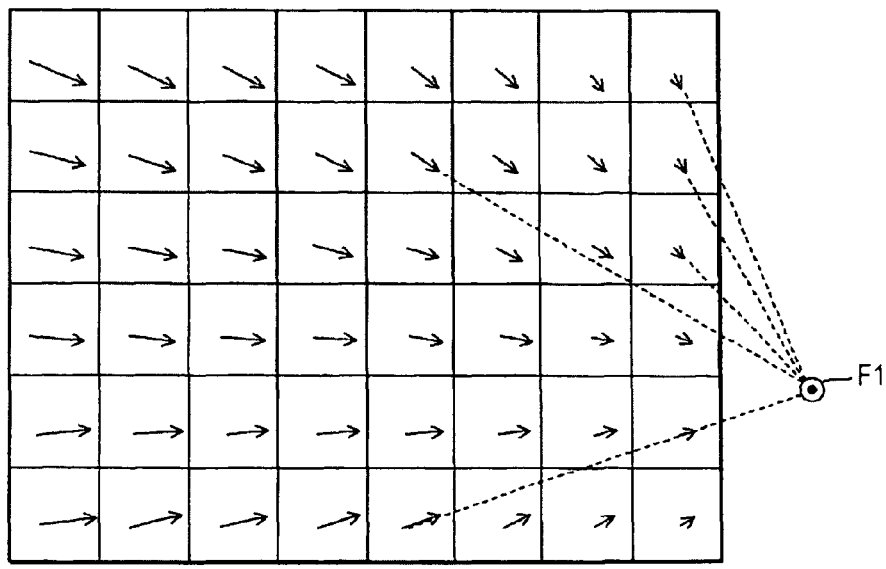

For example, when a picture of the front side is taken from a movable body such as a vehicle moving in a proceeding direction, the movement vectors are calculated in a shape going out from one point F1 as shown in FIG. 7(a). One point F1 becomes the infinite point. The infinite point F1 may exist within the picture as shown in FIG. 7(a), but the infinite point F1 may exist outside the picture as shown in FIG. 7(b). When a picture of the rear side is taken from the movable body moving in the proceeding direction, movement vectors have a shape coming into one point. The one point F1 becomes the infinite point.

When it is judged that the infinite point does not exist in step S6, the process goes to step S7 because the movement vectors for the segment pictures are different from one another. Then, it is determined that the hand-vibration collection is not performed and the process goes to step S5. In this case, the movement control of the image cutting-out region is not performed.

When the infinite point exists in step S6, the process goes to step S8 and it is judged as to whether or not the coordinate position of the infinite point is at an infinite position. As described with reference to FIG. 6, when a picture of the side scene is taken from a train or the like moving in the proceeding direction, a position in the direction of the movement vector in the coordinate position of the infinite point is at the infinite position.

If the result of step S8 shows that the coordinate position of the infinite point is at a finite position, the process goes to step S9. Otherwise, that is, if the coordinate position of the infinite point is at an infinite position, the process goes to step S10.

In step S9, a hand-vibration amount is calculated using the infinite point at the finite position and the image cutting-out region is determined, and the process goes to step S5. In step S10, the hand-vibration amount is calculated using the infinite point at the infinite position and the image cutting-out region is determined, and the process goes to step S5.

Figure 8A:
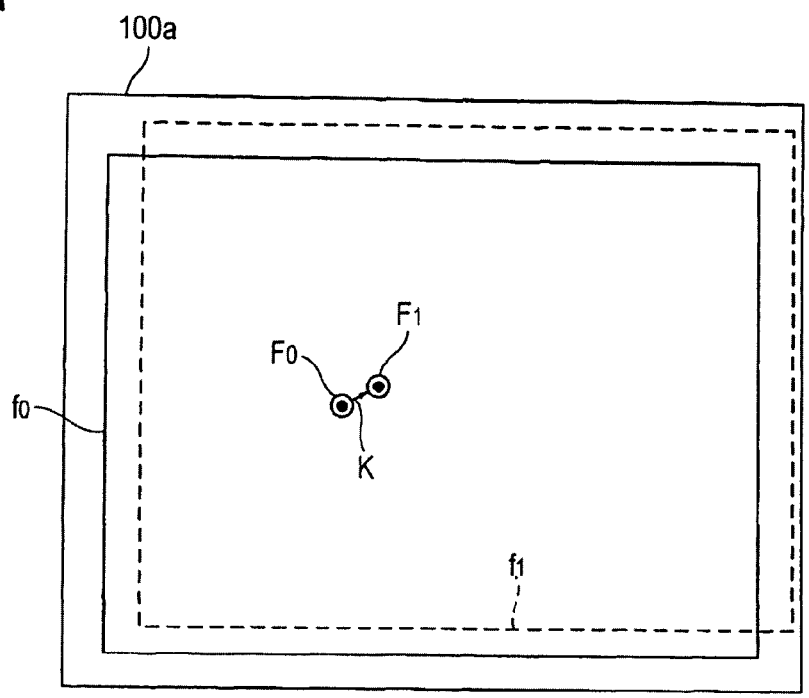
FIG. 8 is a diagram illustrating movement control of an image cutting-out region.
Figure 8B:
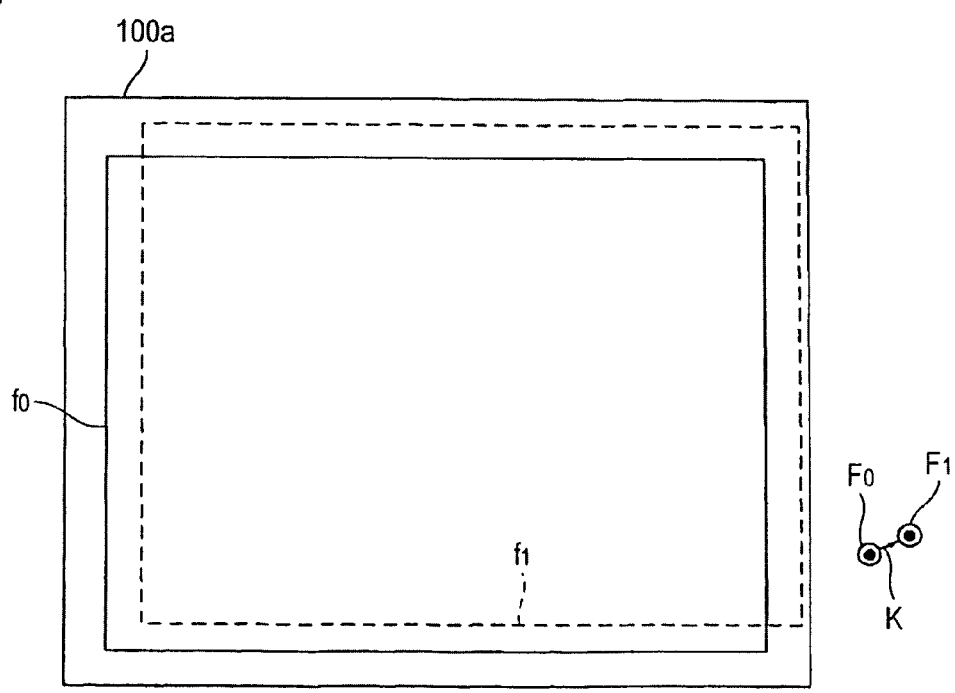

Next, the process in step S9 will be described. It is assumed that the infinite point calculated from the previous frame image is defined as F0 and the infinite point calculated from the current frame image is defined as F1. In this case, a difference between F0 and F1 is a hand-vibration vector k. Therefore, as shown in FIGS. 8(a) and 8(b), if the infinite point F1 calculated from the current frame image is moved after an image of a cutting-out region f0 is cut out from the previous frame image from which the infinite point F0 is calculated, a cutting-out region f1 is determined from the current frame image so that the infinite point F1 in the cutting-out image overlaps the infinite point F0 in the previous cut-out image f0. Therefore, the infinite point in the image cut out for each frame is fixed in the display image, and it is possible to obtain an output image in which the hand-vibration including the vibration of the train or the like is suppressed.

The method described with reference to FIG. 8 is an example of the hand-vibration collection using the infinite point. There are other hand-vibration correction methods using the infinite point. Hereinafter, the hand-vibration correction method using the infinite point will be described.

First Example

Figure 9:
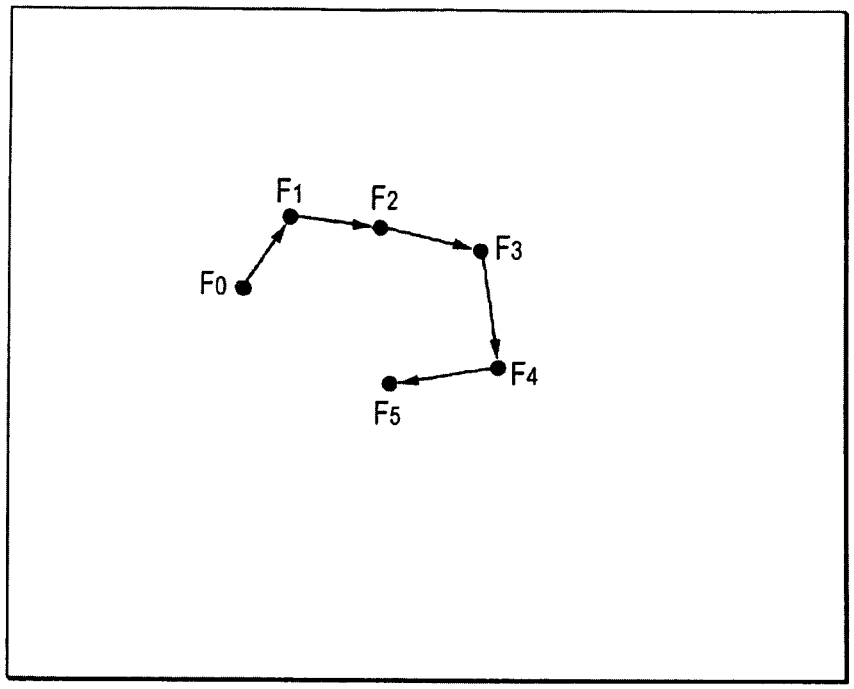
FIG. 9 is a diagram illustrating movement of the infinite point due to a hand vibration.
Figure 10:
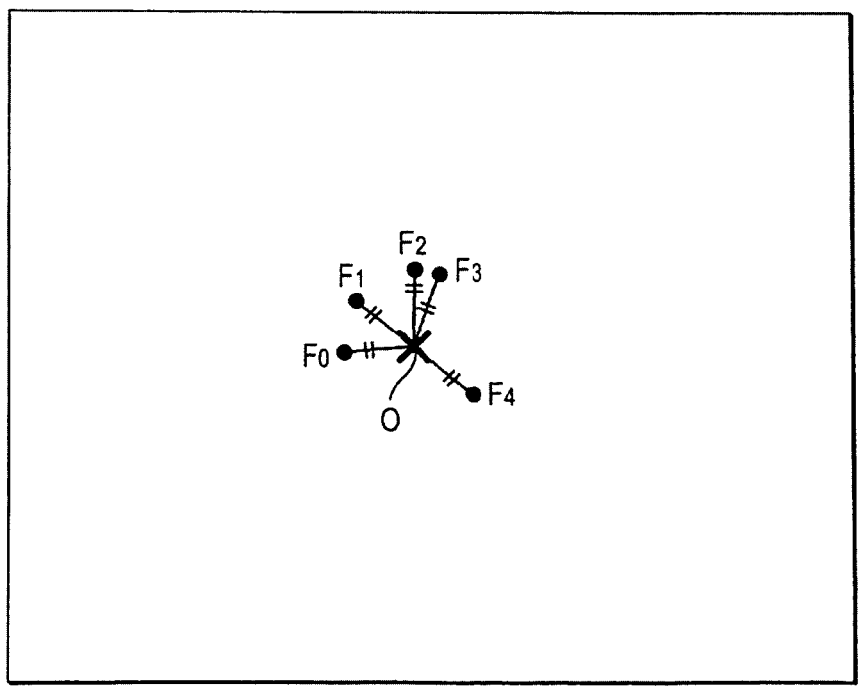
FIG. 10 is a diagram illustrating an example of hand-vibration correction that uses the infinite point.

A first example is the hand-vibration correction method described with reference to FIG. 8. As shown in FIG. 9, when the movement control of the image cutting-out region is not performed, the infinite points FIG. 9 shows the case where the infinite points exist within the picture) obtained from the frame images move F0→F1→ . . . →F4→ . . . . In the method of the first example, a cutting-out region is determined so that the infinite points F0, F1, F2, . . . , F4, . . . do not move in the cut-out image.

Second Example

In the first example, the vibrating infinite point is fixed in the display image as shown in FIG. 9. However, even if the infinite point is not fixed, it is possible to obtain an image to see easily. In a second example, an image central point O is calculated in advance, and a distance L between a coordinate position of the finite point F0 calculated at a predetermined time and the central point O is calculated. Then, an image cutting-out region is determined so that a distance between each of the infinite points F1, F2, F3, . . . calculated at next and subsequent times and the central point O becomes equal to the distance L. Accordingly, it is possible to solve difficulty, caused by the hand-vibration, in seeing the image.

Third Example

Figure 11:
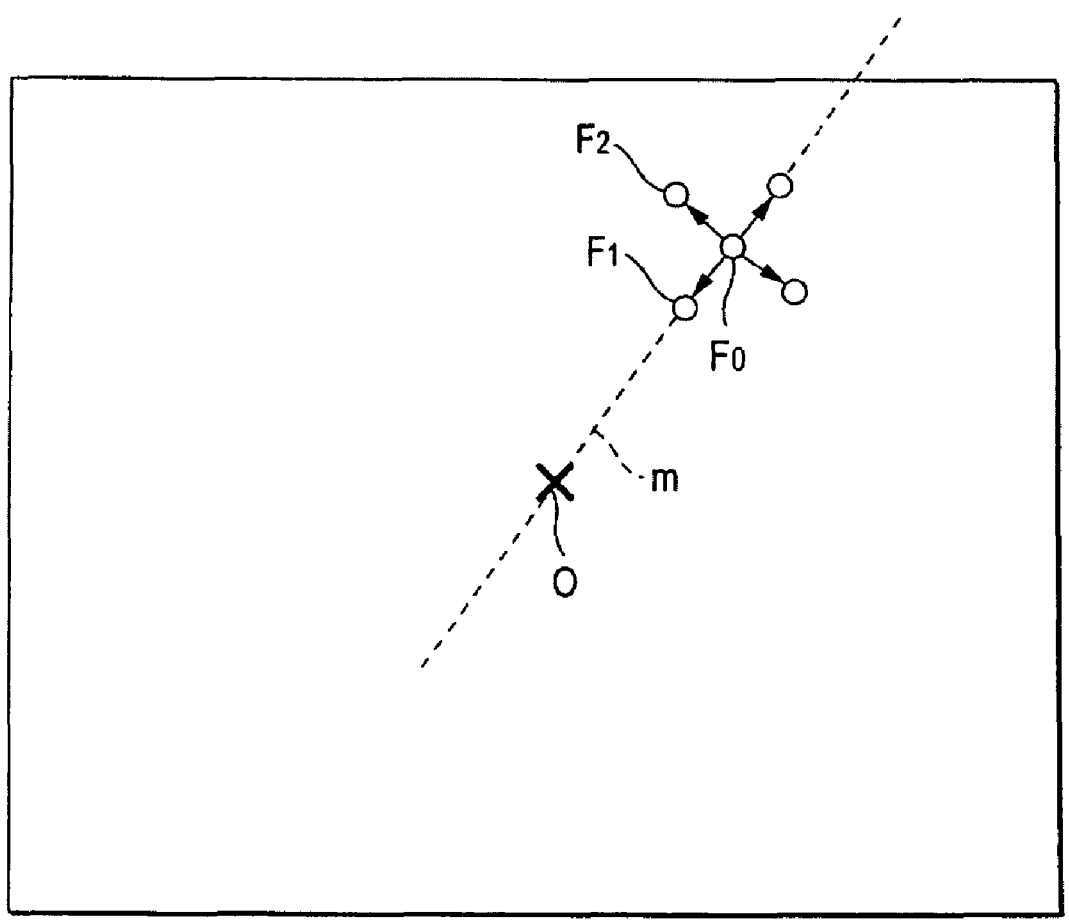
FIG. 11 is a diagram illustrating another example of the hand-vibration correction, which uses the infinite point.

As shown in FIG. 11, a straight line m connecting the image central point O to the infinite point F0 detected at a predetermined time is calculated. If the infinite point F1 calculated at the next frame moves on the straight line m, the hand-vibration correction is not performed. If the calculated infinite point F2 moves in a direction perpendicular to the straight line m, the hand-vibration correction is performed and an image cutting-out region is determined so that the infinite point F2 is on the straight line m. In other words, of the vibration vector between the infinite points, the hand-vibration correction is not performed using components along the straight line m, and the hand-vibration correction is performed using components perpendicular to the straight line m.

The vibration along the straight line m corresponds to vibration along the proceeding direction of the movable body such as a vehicle, while the vibration perpendicular to the straight line m corresponds to vertical vibration of the movable body such as a vehicle. For this reason, even when the vibration along the proceeding direction is not corrected, there is no incongruity in the image. When only the vertical vibration of the movable body such as a vehicle is corrected, it is possible to obtain an image to see easily.

In the embodiment, the hand-vibration correction method using the infinite point of the third example is prepared and the method may be properly selected and applied in accordance with a situation.

The third example is applied to the hand-vibration correction in step S10 of FIG. 4. Since the coordinate position of the infinite point is at the infinite position, the movement of the infinite point in the direction along the straight line m is not calculated. However, since it is possible to detect the vibration of the infinite point perpendicular to the straight line m, the correction of the vibration perpendicular to the straight line m is performed.

In addition, it is possible to output the cutting-out region in step S5 of FIG. 4 in response to sensitivity of human eyes. The human eyes are sensitive to vibration of 7 Hz and are insensitive to vibration of 1 Hz or less. Accordingly, a high pass filter may be add to an output path from the hand-vibration vector operation processing section 55 to the memory 30 in FIG. 2. The variation of 1 Hz or more within the cutting-out region is output to the memory 30, while the variation of 1 Hz or less within the cutting-out region is not output, and the cutting-out region may be fixed. Thereby, the hand-vibration correction is performed only when the hand vibration fluctuates at a high frequency and thus the image does not vibrate. When the hand vibration fluctuates at a low frequency, the image vibrates at a low frequency. However, this low-frequency vibration does not discomfort the human eyes.

According to the embodiments described above, since the hand-vibration correction is performed using the infinite point, it is possible to perform an electronically accurate correction for the hand-vibration including the vibration of the movable body occurring at the time of taking a picture of the outside of the movable body from the movable body. Therefore, it is possible to obtain an image to see easily, by taking a picture.

In the embodiment described above, the processes are performed inside the digital camera. However, the following processes may be performed in the same manner: all the image data output from the solid-state imaging element 100 are recorded; the image data are stored in the external personal computer; and the electronic hand-vibration correction program is executed by a personal computer.

In the embodiment described above, one picture is divided into 48 segment pictures. However, the number of segment pictures is not limited thereto, and the number of segment pictures may be any number so long as there is no difficulty to calculate the infinite point.

The electric hand-vibration correction according to the invention can be appropriately performed even when a picture of the outside of the movable body is taken from the movable body. Therefore, the electric hand-vibration correction is effectively applicable to the digital camera or the like.

What is claimed is:

1. An electric hand-vibration correction method comprising:
dividing each of frame images output from an effective pixel region of an imaging element in frame order into a plurality of segment images;
calculating a movement vector of each segment image between the frame images;
calculating a hand-vibration vector that is a movement vector of each entire frame image, from the movement vectors for the respective segment images;
determining an image output region that is cut out from each frame image, based on the hand-vibration vector; and
calculating an infinite point based on an intersectional position among the calculated movement vectors of the respective segment images, wherein
the image output region is determined using a vibration vector between the infinite points calculated for the respective frame images as the hand-vibration vector, wherein
a straight line connecting a infinite point calculated for a certain frame image and a central point of the certain frame image is calculated, and
the image output region is determined based on a component, of the vibration vector between the infinite point calculated for the certain frame image and an infinite point calculated for a next frame image, perpendicular to the straight line with a component, of the vibration vector between the infinite point calculated for the certain frame image and the infinite point calculated for the next frame image, along the straight line being ignored.

2. The electric hand-vibration correction method according to claim 1, wherein the image output region is determined so as to correct only components having a variation frequency equal to or higher than a predetermined frequency in the vibration vectors calculated in frame order.

3. An electric hand-vibration correction device, wherein each of frame images output from an effective pixel region of an imaging element in frame order is divided into a plurality of segment images, a movement vector of each segment image between the frame images is calculated, a hand-vibration vector that is a movement vector of each entire frame image, is calculated from the movement vectors for the respective segment images, and an image output region that is cut out from each frame image is determined based on the hand-vibration vector, the electric hand-vibration correction device comprising:
a unit that calculates an infinite point based on an intersectional position among the calculated movement vectors of the respective segment images and determines the image output region using a vibration vector between the infinite points calculated for the respective frame images as the hand-vibration vector, wherein
a straight line connecting a infinite point calculated for a certain frame image and a central point of the certain frame image is calculated, and
the image output region is determined based on a component, of the vibration vector between the infinite point calculated for the certain frame image and an infinite point calculated for a next frame image, perpendicular to the straight line with a component, of the vibration vector between the infinite point calculated for the certain frame image and the infinite point calculated for the next frame image, along the straight line being ignored.

4. The electric hand-vibration correction device according to claim 3, wherein the image output region is determined so as to correct only components having a variation frequency equal to or higher than a predetermined frequency in the vibration vectors calculated in frame order.

5. An imaging apparatus comprising:
an imaging element; and
the electric hand-vibration correction device according to claim 3.

6. A non-transitory computer-readable medium storing a program to cause a computer to execute electric hand-vibration correction, the electric hand-vibration correction comprising:
dividing each of frame images output from an effective pixel region of an imaging element in frame order into a plurality of segment images;
calculating a movement vector of each segment image between the frame images;
calculating a hand-vibration vector that is a movement vector of each entire frame image, from the movement vectors for the respective segment images;
determining an image output region that is cut out from each frame image, based on the hand-vibration vector; and
calculating an infinite point based on an intersectional position among the calculated movement vectors of the respective segment images, wherein
the image output region is determined using a vibration vector between the infinite points calculated for the respective frame images as the hand-vibration vector, wherein
a straight line connecting a infinite point calculated for a certain frame image and a central point of the certain frame image is calculated, and
the image output region is determined based on a component, of the vibration vector between the infinite point calculated for the certain frame image and an infinite point calculated for a next frame image, perpendicular to the straight line with a component, of the vibration vector between the infinite point calculated for the certain frame image and the infinite point calculated for the next frame image, along the straight line being ignored.

7. The non-transitory computer-readable medium according to claim 6, wherein the image output region is determined so as to correct only components having a variation frequency equal to or higher than a predetermined frequency in the vibration vectors calculated in frame order.

* * * * *